June 27, 1967  G. A. HARNESS ETAL  3,327,479
LOW TRAVEL HYDRAULIC BOOSTER WITH INTEGRAL RESERVOIR
Filed May 17, 1965  2 Sheets-Sheet 1

INVENTORS
Gerald A. Harness
George E. Kellogg
BY
Donald P. Selwecki
THEIR ATTORNEY INVENTORS
Gerald A. Harness
George E. Kellogg
BY
Donald P. Selwerski
THEIR ATTORNEY 3,327,479
LOW TRAVEL HYDRAULIC BOOSTER WITH INTEGRAL RESERVOIR
Gerald A. Harness, Kettering, and George E. Kellogg, Miamisburg, Ohio, assignors to General Motors Corporation, Detroit, Mich., a corporation of Delaware
Filed May 17, 1965, Ser. No. 456,188
8 Claims. (Cl. 60—54.6)

This invention relates to power brake boosters and more particularly to an hydraulic booster having an integral reservoir and a pedal lifting mechanism.

Zero travel brake boosters of common design generally require very little pedal travel for their operation. Consequently, the brake pedal is mounted near the toe board of a vehicle in order to minimize clutter above the floor level in a vehicle. However, during conditions of operation when power failure is experienced, greater pedal travel is advantageous for operation of the vehicle braking system. A higher pedal generally provides several advantages among which are greater movement of a pedal for unpowered brake operation and the availability of a greater mechanical advantage for unpowered brake actuation.

It is an object of the present invention to provide an improved brake booster incorporating the pedal lift mechanism responsive to pressure in the booster.

It is another object of the present invention to provide an improved power brake booster which incorporates a novel "feel" arrangement allowing better modulation of braking pressures.

It is still another object of the present invention to provide an improved power brake booster which automatically repositions a brake pedal during powered and unpowered operation of the booster and which incorporates means for preventing forceful brake pedal lowering when power to a booster is restored after a failure.

It is a further object of the present invention to provide an improved power brake booster having reaction means which is internally and externally piloted and which is fully operative during eccentric movement thereof.

It is still a further object of the present invention to provide an improved power brake booster utilizing a spring loaded ball check valve which is limited in travel to provide a constant flow of pressurized fluid into the brake booster.

Further objects and advantages of the present invention will be apparent from the following description, reference being had to the accompanying drawings wherein a preferred embodiment of the present invention is clearly shown.

Figure 1:
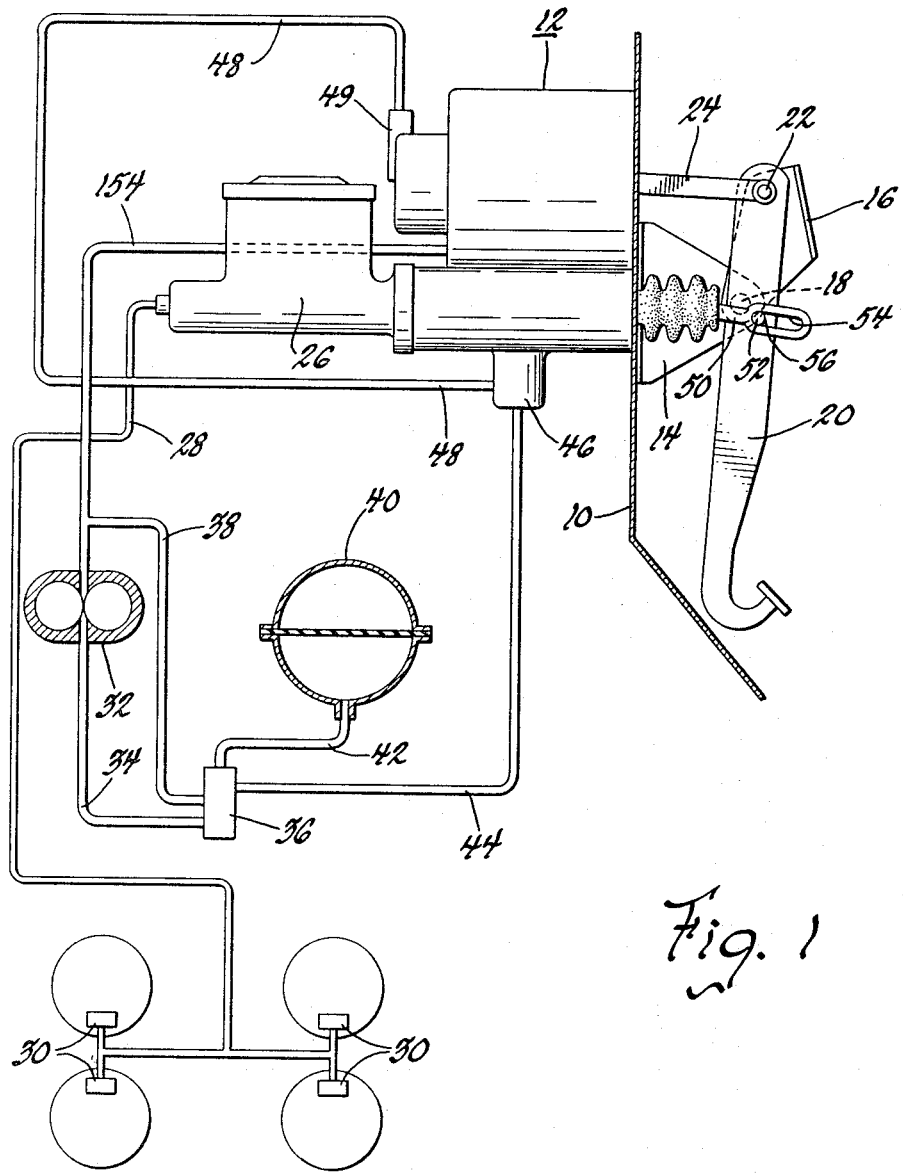
FIGURE 1 is a diagrammatic illustration of a power brake booster which is the subject of the present invention illustrated in a typical vehicle braking system.

Referring now to FIGURE 1, fire wall 10 carries on one side a fixed bracket 14. Bracket 14 pivotally supports an element 16 at point 18 and also pivotally engages a brake pedal 20 at point 22. Lifter arm 24 is pivoted at point 22 and internally carried by booster body 12 in a manner to be hereinafter described. Master cylinder 26 is carried by or preferably integrally formed with booster body 12 and distributes hydraulic pressure through line 28 to wheel cylinders 30 in a conventional manner.

Fluid pump 32 provides fluid under pressure through line 34 to valve 36. Valve 36 serves as a by-pass for pump 32 through line 38 and also is pressurized by accumulator 40 through line 42. An output line 44 from valve 36 communicates fluid under pressure of a predetermined magnitude to a booster inlet 46. Inlet 46 communicates fluid under pressure to a valve mechanism in a manner to be hereinafter described and also communicates pressure through line 48, to an inlet 49, to a pedal lifting portion of booster body 12 in a manner to be hereinafter described.

Figure 2:
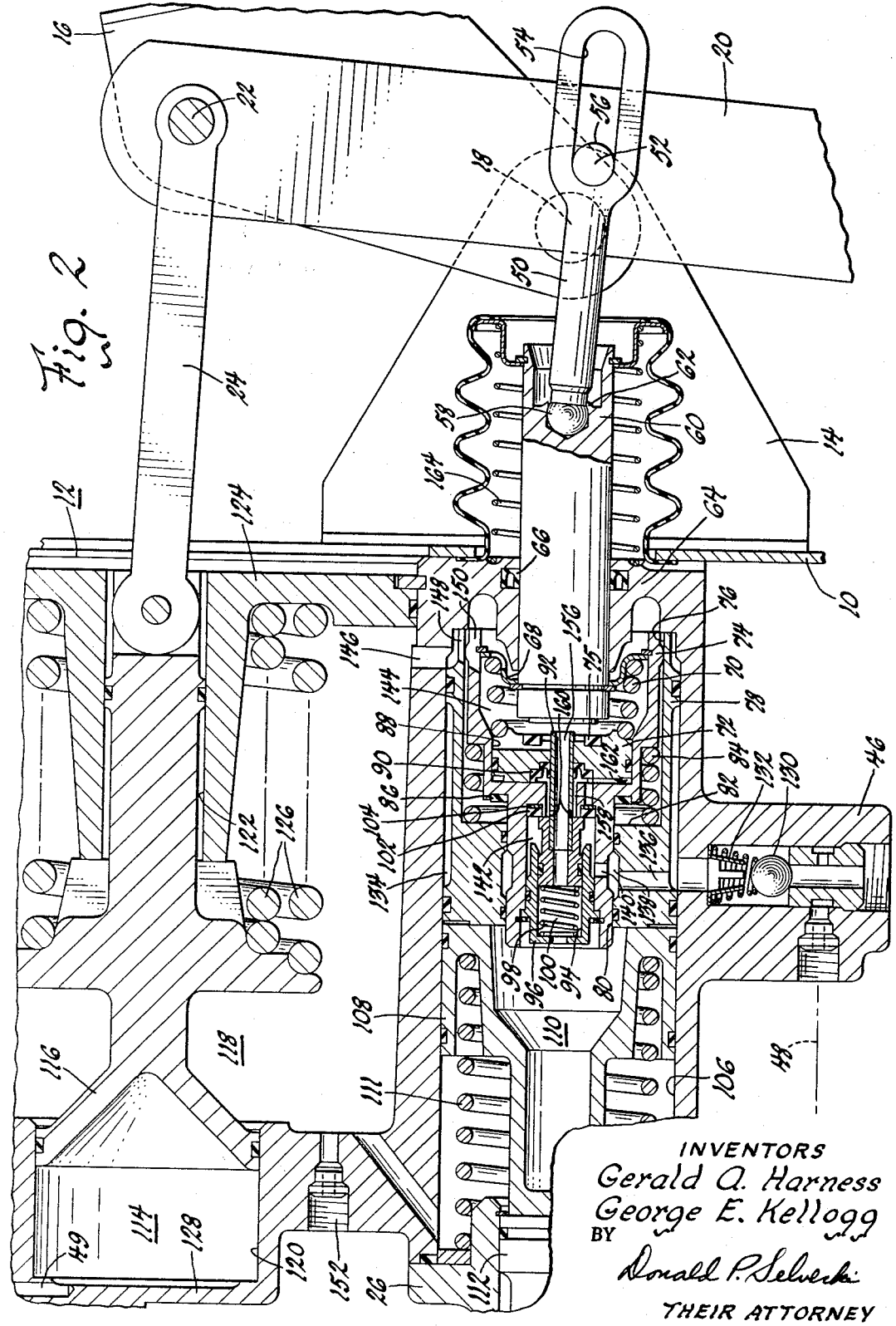
FIGURE 2 is a sectional view of the brake booster of FIGURE 1.

Referring to FIGURE 2, brake pedal 20 slidably and pivotably engages push rod 50 at point 52. Slot 54 is provided in push rod 50 to allow a slip connection between pin 56, carried by pedal 20, and push rod 50 for reasons to be hereinafter described. Push rod 50 has a spherical portion 58 pivotally engaging the valve actuator 60. It is noted that peened-over portion 62 engages spherical portion 58 thereby resisting accidental disengagement of push rod 50 from valve actuator 60.

Valve actuator 60 is slidable in end 64 forming a closure means for booster body 12. Seal 66 peripherally disposed around valve actuator 60 allows sliding movement of valve actuator 60 relative to end 64 while preventing the casual passage of fluid from the interior of the booster body to the atmosphere as well as preventing foreign material from the atmosphere from passing into the booster body. Spring retainer 68 firmly engages a floating valve body 74 and retains reaction spring 70 between retainer 68 and reaction piston 72. Resilient bumper 75 is carried on one face of reaction piston 72 and positioned so as to be engaged by valve actuator 60 during unpowered operation of the subject invention.

Floating valve body 74 is slidably disposed in bore 76 of valve body 78 and is piloted in bore 80 of valve body 78. Floating valve body 74 is biased away from wall 82 of valve body 78 by spring 84. Resilient bumper 86 is carried on a surface of the floating valve body 74 at a position where it engages wall 82 of valve body 78 during unpowered operation of the subject device. Reaction piston 72 is externally piloted in bore 88 of the floating valve body 74. V-type seal 90 is carried by reaction piston 72 and serves to allow a certain amount of eccentricity and cocking of the reaction piston relative to control valve 92 during relative movement therebetween while maintaining a positive seal.

Control valve 92 is piloted in reaction piston 72 on one end and in bore 94 formed in plug 96 of the floating valve body 74. Spring 98 urges control valve 92 toward one extremity of chamber 100 formed in plug 96. Valve seat 102 is maintained in separated disposition from floating valve body 74 by coined washer 104 which allows a lower pressure to be present behind valve seat 102 during engagement of control valve 92 therewith. This differential pressure tends to maintain valve seat 102 in its operative location.

Valve body 78 is slidable in bore 106 of booster body 12 and is separated from multiplier piston 108 by pressurized fluid in chamber 110 during powered operation of the subject device. During periods of low pressure in chamber 110, spring 111 bears against a wall of the booster body 12 and multiplier piston 108, thereby maintaining engagement between valve body 78 and multiplier piston 108. Multiplier piston 108 provides an output means for booster body 12 and operatively engages input member 112 of hydraulic master cylinder 26. Therefore, it is seen that movement of multiplier piston 108 results in a pressurization of master cylinder 26 resulting in pressurization of brake line 28 in a conventional manner.

Chamber 114, hereinafter referred to as the second chamber, is normally pressurized through inlet 49, thereby maintaining lifter piston 116 at one extreme of movement in chamber 114. Chamber 118, sometimes referred to herein as the third chamber, is normally unpressurized and is utilized as a reservoir from the brake booster. Lifter piston 116 is slidable in bore 120 of chamber 114 and in bore 122 of the lifter closure means 124. Spring pack 126 serves to bias lifter piston 116 toward wall 128 of booster body 12. Lifter arm 24 is pivotally carried by piston 116 and is responsive to movement thereof. It is clear then that, when pressure in chamber 114 becomes dominant or when spring pack 126 becomes dominant, a sliding movement of lifter arm 24 will result and, consequently, pivot point 22 for brake pedal 20 will move resulting in the pivoting of pedal 20 around pivot point 52 bringing about a higher or lower pedal for unpowered or powered operation of the brake booster. It is understood that pressure in inlet 46 is the same as pressure in inlet 49 so that chamber 114 is pressurized when the valving mechanism is pressurized.

Spring loaded ball check valve 130 is limited in its travel during pressurization of line 44 by limiting flange 132, thereby allowing a controlled flow of pressurized fluid into the booster body.

In operation of the subject booster, pressurized fluid provided by pump 32, as seen in FIGURE 1, provides fluid under pressure to inlet 46. A relatively constant pressure is maintained at inlet 46 by use of accumulator 40. The same pressure in inlet 46 is also provided at inlet 49 into chamber 114. Pressurization of chamber 114 maintains lifter piston 116 substantially in the position illustrated in FIGURE 2. When lifter piston 116 is so located, lifter closure means 124 maintains pivot point 22 for brake pedal 20 in a position wherein brake pedal 20 is located in proximity to the toe board of a vehicle which is the normal position for powered operation of the booster. The fluid entering the booster is flow regulated by ball check valve 130 and normally passes into peripheral chamber 134, through passage 136, chamber 138, through passage 140 into chamber 142. Therefore, chamber 142 is constantly pressurized with fluid from pump 32. Reservoir pressure from chamber 118 is present in chamber 144 by a communication path established through passages 146, 148 and 150. An outlet 152 from chamber 118 is provided to communicate fluid to line 154 which is a return path to pump 32.

On a brake actuation, it is desired during conditions of powered operation that brake pedal 20 carrying pin 56 is pivoted toward the booster body. Push rod 50 engaging valve actuator 60 moves against the force of spring 164 into engagement with control valve 92. It is noted that the pressure of the reservoir fluid in chamber 144 is communicated through the open center 156 of control valve 92 through chamber 100 into chamber 110. When valve actuator 60 engages control valve 92, fluid communication is cut off between unpressurized chamber 144 and pressurizable chamber 110. Further movement of actuator 60 results in moving control valve 92 off seat 102 resulting in the communication of pressure from pressurized chamber 142 into chamber 158 and through apertures 160 into open center 156 of control valve 92. Pressurization of chamber 110 results along with a pressurizing force against reaction piston 72 in chamber 158. A "feel" is to be provided through reaction piston 72, through bumper 75 to actuator 60.

It is noted that pressure from chamber 158 is also communicated into chamber 162 resulting in a forced separation of reaction piston 72 from floating valve 74 against the force of spring 84. In this manner, a modulating effect is had for operation of the subject valve mechanism resulting in a more positive control by the vehicle operator offering force to brake padel 20. As pressurization in chamber 110 exceeds the force of spring 111, a sliding movement is imparted to multiplier piston 108, thereby causing an input force against member 112 bringing about a pressurization of master cylinder 26.

When force is released from brake pedal 20, actuator return spring 164 draws actuator 60 away from control valve 92 allowing the pressure in chamber 110 to be exhausted through open center 156 to chamber 144 and into reservoir chamber 118. Springs 111, 98, 84 and 70, compressed during powered operation, reposition the appropriate valving members to a poised position readying the booster for another actuation.

When a fluid loss or pressure failure is experienced behind inlet 46, ball check valve 130 reseats trapping fluid in the booster body, thereby preventing excessive fluid loss while, simultaneously, pressure in chamber 114 is lost. Spring pack 126 becomes a dominant force acting on lifter piston 116 resulting in a leftward movement of piston 116 as viewed in FIGURE 2. Lifter arm 24 is carried by lifter piston 116 and follows the movement thereof, resulting in a movement of pivot point 22 in a counter-clockwise manner around pin 56. Brake pedal 20 is thereby positioned at a higher point relative to the toe board of a vehicle allowing more travel for manual actuation of the booster and braking system and also providing a higher mechanical advantage for brake actuation than originally available. It is understood that the availability of a higher mechanical advantage depends upon the relative position of pivot points 22 and 52 during powered capability of the booster when brake pedal 20 is positioned near the vehicle toe board. A mechanical advantage helpful to brake actuation is not a requirement during powered operation of the brake booster but is desirable when actuation is under unpowered conditions.

Unpowered actuation of the booster is accomplished by pivoting brake pedal 20 in the conventional manner against push rod 50. Movement of push rod 50 results in valve actuator 60 moving against resilient bumper 75 carried by the reaction piston 72. Reaction piston 72 normally engages floating valve body 74 and immediately drives floating valve body 74 and bumper 86 into engagement with wall 82 of valve body 78. Valve body 78 normally enagges multiplier piston 108 when chamber 110 is unpressurized and so a direct path for force transmission is established between pedal 20 and master cylinder 26. When the described valve gaps are taken up, the brakes are actuated in a conventional unpowered manner. Springs 111, 84, 70 and 164 result in a repositioning of the associated valving mechanism to a poised position upon release of pressure on brake pedal 20.

When repairs are effected to a leaking system, pressure is again provided at inlet 46. Line 48 communicates this pressure through inlet 49 into chamber 114. Lifter piston 116 is driven to the right, as viewed in FIGURE 2, against the force of spring pack 126. Lifter arm 24 follows this movement of piston 116 and repositions pivot point 22 in a clockwise manner relative to pivot point 18. It is noted that a slot 54 is provided at push rod 50 to prevent pedal 20 from being immediately driven to a point near the vehicle toe board where an operator's foot or other object lying beneath the brake pedal 20 could be crushed. If there is no resistance to pivotal movement of brake pedal 20 during powered operation, pin 56 slides in slot 54 and brake pedal 20 is located near the toe board in its standard location for powered operation of the booster.

The utility of the subject device for providing greater travel for a brake pedal during unpowered operating conditions is obvious. Additional features of novelty are the limiting of the travel of ball check valve 130 to provide controlled flow into the booster body as well as the operative mounting of seat 102 to floating valve body 74 by means of the coined washer. In this manner, seat 102 is operably positioned and destructive wear thereon is delayed.

The novel spring loading of the floating valve body and the reaction piston also provides a modulation capability along with a "feel" for booster actuation which is very desirable for a vehicle operator in a power system. Also to be noted is the V-type seal carried by reaction piston 72 against control valve 92 allowing for a certain amount of eccentricity or cocking of the reaction piston 72 during its movement while maintaining a seal against fluid passage from chamber 144 into chamber 158. Also, the reaction piston 72 has a stepped back outer diameter moving on bore 88 which permits axial movement on control valve 92 during brake actuation.

The cooperation of slot 54 and pin 56 previously described is a safety feature lending to utility of the device and third chamber 118 dually acting as a reservoir and container for the spring pack and piston is likewise a novel feature.

While the embodiment of the present invention, as herein disclosed, constitutes a preferred form, it is to be understood that other forms might be adopted.

What is claimed is as follows:

1. In a power brake booster including a booster body; a pressure source communicating fluid under pressure to said booster body; valve means slidably disposed within said booster body and arranged to selectively route pressure within said booster body; an hydraulic master cylinder for distribution of pressure to vehicle brakes and being integral with said booster body; actuator means drivably engaging said valve means and arranged to selectively reposition said valve means to generate an output force; and output means diposed between said valve means in said booster body and said hydraulic master cylinder, said output means responsive to pressure from said pressure source selectively routed to said output means by said valve means to generate a braking pressure, the improvement comprising a chamber integrally formed with said booster body having two normally pressurizable portions and a non-pressurizable portion, a first and second pressurized portion and a third non-pressurized portion, said third non-pressurized portion acting as a reservoir for said booster body during normal operation of the brake booster and a pedal raising mechanism carried in said third non-pressurized portion and responsive to fluid pressure in said second pressurized portion to maintain the actuator means in a position determined by pressure available from the pressure source to said second portion.

2. In a power brake booster for a vehicle braking system, said booster including a booster body carried by a fixed portion of a vehicle and having at least three chambers therein; a fluid pressure source communicating fluid under pressure to a first and second chamber in the booster body; valve means slidably disposed within a first chamber of said booster body and arranged to selectively control pressure distribution to various portions of said booster body; actuator means drivably engaging said valve means and arranged to selectively control said valve means; and an hydraulic master cylinder integrally formed with said booster body and being in fluid communication with a third unpressurized chamber; output means slidable in said first chamber and responsive to a pressure build-up therein to actuate said hydraulic master cylinder under conditions of powered operation and responsive to actuator means induced movement of said valve means during unpowered operation of said booster to actuate said master cylinder; the improvement comprising: a pedal lift means slidable in the second chamber in said booster body normally pressurized and operatively disposed in the third chamber of said booster body normally unpressurized and acting as a fluid reservoir for said booster body, said second and third chambers being separated by piston means formed as a portion of said pedal lift means being biased toward said second chamber and including a portion pivotally supporting said actuator means, said actuator means being controllably pivotally supported at various positions relative to said booster body in response to the degree of pressurization of said second chamber.

3. The improvement according to claim 2 wherein said actuator means includes means for adjusting the driving engagement of said actuator means with said valve means.

4. The improvement according to claim 2 wherein said booster body includes a spring loaded ball check valve adapted to be unseated by pressure from said pressure source, said booster body providing a limiting flange arranged to contact said ball check valve after it becomes unseated in response to incoming pressure thereby allowing a controlled flow of pressurized fluid into said booster body.

5. In a power brake booster for a vehicle braking system, said brake booster comprising: a booster body carried by a relatively fixed portion of a vehicle and including at least three chambers formed therein, a first and second of said chambers being normally pressurized and a third chamber being normally unpressurized and including a piston slidable therein; a pressure source communicating pressure to said first and second chambers in said booster body; an hydraulic master cylinder carried by said booster body and pressurizable by a selective pressurization of said first chamber; valve means slidable in said first chamber of said booster body and controllable to selectively pressurize said first chamber; an actuator means pivotally supported by said piston in said third chamber and drivably engaging said valve means to selectively pressurize portions of said first chamber to operate said hydraulic master cylinder, said support of said actuator means being variably positioned in response to pressure in said second chamber whereby said actuator means presents a greater mechanical advantage for unpowered operation than as originally positioned and provides more travel for said actuator means to allow manual displacement of said valve means during conditions of unpowered operation the improvement comprising: a valve body slidable in said first chamber; a floating valve body including a resilient seat held in position by a coined washer, said floating valve body being sliable in said valve body; and a control valve slidable in said floating valve body and including a portion arranged to engage the seat of said floating valve body, said control valve including a portion adapted to be engaged by said actuator means thereby being selectively repositionable in said floating valve body to route pressure from said pressure source to another portion of said first chamber whereby an output force is generated in said hydraulic master cylinder for actuation thereof.

6. The improvement according to claim 5 wherein said floating valve body is biased away from a portion of said valve body thereby creating a resistance to sliding movement of said floating valve body relative to said valve body during movement of said actuator means thereby providing a resistance to a pivotal movement of said actuator means, said resistance allowing modulation of said pressure distribution in said first chamber by said actuator means.

7. The improvement according to claim 5 wherein said valve means includes a reaction piston piloted by a portion of said control valve and slidable in said floating valve body and biased away from said actuator means, said reaction piston being responsive to a pressure build-up in said floating valve body when said control valve is unseated by said actuator means to provide a resisting force against further movement of said actuator into said valve means.

8. The improvement according to claim 7 wherein said reaction piston includes a seal having a V shaped cross section for slidably locating said reaction piston on said control valve, said V-type seal permitting a certain amount of eccentricity and cocking of the reaction piston during operation thereof while maintaining a positive seal between said reaction piston and said control valve.

References Cited

UNITED STATES PATENTS

| | | | |
|---|---|---|---|
| 2,847,829 | 8/1958 | Gladden | 60—54.6 |
| 3,250,183 | 5/1966 | Gephart | 91—391 |
| 3,267,663 | 8/1966 | Schultz | 60—10.5 |

MARTIN P. SCHWADRON, *Primary Examiner.*

ROBERT R. BUNEVICH, *Examiner.*